Feb. 13, 1962     E. H. CHRISTIAN ETAL     3,021,515
FAULT INDICATOR
Filed Nov. 27, 1957
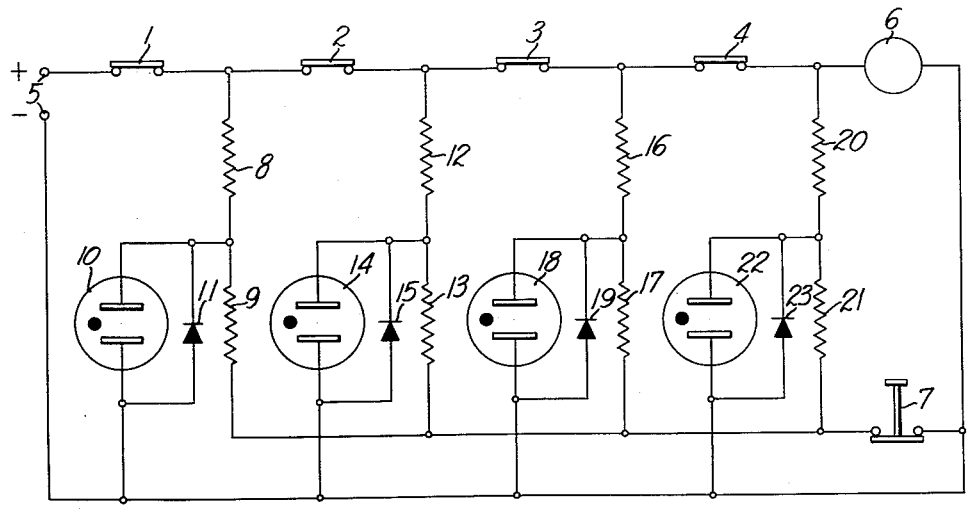
Inventors
Edward H. Christian
Eugene E. Alreda
By Carl A. Laumann Jr.
Attorney

3,021,515
FAULT INDICATOR
Edward H. Christian, Milwaukee, and Eugene C. Ureda, West Allis, Wis., assignors to Allis-Chalmers Manufacturing Company, Milwaukee, Wis.
Filed Nov. 27, 1957, Ser. No. 699,393
9 Claims. (Cl. 340—253)

This invention relates generally to fault indicating circuits and in particular to circuits using gas filled two element glow tubes to indicate the condition of interlock contacts.

On high production mill equipment the accidental down time must be minimized if high productivity is to be obtained. The use of protective devices with automatic reset features to restart the equipment after a momentary fault has been cleared substantially decreases the down time due to self-clearing faults. To facilitate the location and repair of such self-clearing faults a record should be preserved to permit the operator to note the point where the fault occurred.

Various types of fault indicators has been used in the past; for example, an indicating light connected to a tap switch which may be successively connected to each of the interlocks until the open interlock is detected. This system has a disadvantage that it is not effective where an automatic reset feature is used in conjunction with the interlock and therefore the location of a temporary or intermittent fault is very difficult. Other indicators have been built using two or three element glow tubes but these have the shortcoming that the induced voltage from deenergizing the undervoltage relay or other electroresponsive device may relight the extinguished tube if the interlock recloses quickly. Capacitors have been used to absorb this surge but are not entirely satisfactory. Various other devices have been used to indicate the condition of the interlock but these are unduly complicated or require excessive wiring or space on the control panel. Furthermore, some of these are not fail safe since a normally unlighted lamp is used.

This device uses interlocks which are already available on the protective equipment and requires only a minimum of wiring and panel space. This device prevents relighting of extinguished lights and in addition provides a memory feature which retains a record of an intermittent self-clearing fault. Since the fault indicator requires only a small amount of space it may be placed in a convenient location where the operator can easily observe the condition of the lights. Furthermore, since the device uses cold cathode tubes, no additional power is required.

It is an object of this invention to provide a simple device for indicating a fault in an electrical circuit.

Another object of this invention is to provide a fault indicator using inexpensive two element glow tubes to indicate a fault in an electrical circuit.

It is still another object of this invention to provide a simple, fail safe fault indicator which retains a record of a fault and will record faults of very short duration.

In this system the interlocks for the machine to be protected are in series connection with a constant source of potential. In the embodiment shown and described the interlocks are connected in the undervoltage relay circuit. This invention is applicable to any number of interlocks or switch contacts connected in series.

An impedance forming a voltage divider is connected from one side of each interlock contact to a point on the negative potential side of the undervoltage relay coil.

Each of the voltage dividers has a two element glow tube connected across a portion of the divider so that the voltage across the tube is somewhat less than the striking voltage for the tube and more than the voltage required to maintain conduction through the tube. Initially all tubes will remain unlighted since the voltage is too low to cause the tube to conduct and emit a visible glow. A switch common to all the voltage divider circuits may be opened so that the entire voltage of the source may be placed across the tubes to initiate conduction. When the tube has been lighted, the switch is reclosed, reducing the voltage across the tube to the initial value which now maintains conduction and holds the tube in the lighted condition.

With the opening of an interlock, the voltage is removed from the glow tubes and divider circuits on the low potential side of the interlock contacts and tubes associated with the deenergized divider circuits are extinguished. When the interlock is closed, the voltage is restored to the circuit but extinguished tubes do not relight since the voltage across the portion of the voltage divider to which the tube is connected is sufficient only to maintain conduction and will not light the tube.

The tubes may be relighted, as they were initially, by the operator opening the switch common to all the voltage divider circuits. The tubes will maintain a fault record until the operator desires to clear the indicator by opening this switch.

The single FIGURE is a schematic wiring diagram of one embodiment of the invention.

Referring to the figure, a plurality of interlocks 1, 2, 3 and 4 are connected in a series circuit with an undervoltage relay coil and the power input terminals 5 which are connected to a constant potential source. The interlocks may be operated mechanically, directly from the machine, or they may be contacts on an existing device such as an overload relay.

Each of the protective interlocks has associated with it an indicator circuit which includes the particular interlock with which it is associated and the reset switch 7. For example, one side of interlock 1 is connected to a voltage divider circuit made up of resistors 8 and 9 connected in series between the interlock 1 and the reset switch 7. The impedance means constituting the voltage divider is shown as two resistors 8 and 9 but it will be understood that it could just as well be a single resistor of the proper value with a tap at the appropriate point. A two element, cold cathode discharge tube 10, which may be of the type NE48, well known in the art, has one element connected to the point on the voltage divider common to resistors 8 and 9 and the other element to the negative side of power source 5. A rectifier 11 is connected in a parallel relation to glow tube 10. The polarity of the rectifier is such that it presents a high impedance to the normal voltage drop across resistor 9 caused by the current flowing from terminals 5. The rectifier acts to bypass current around the glow tube when the voltage drop across resistor 9 is reversed.

In a similar manner, interlock 2 has an indicator circuit including voltage divider resistors 12 and 13 connected between the interlock and switch 7, a cold cathode glow tube 14 connected from a point common to resistor 12 and resistor 13 to the negative side of source 5 and a rectifier 15 in parallel with the tube 14.

Interlock 3 has a voltage divider circuit including resistors 16 and 17 in series relation between the interlock and switch 7, a cold cathode glow tube 18 has one element connected to a point comon to resistors 16 ond 17 and the other element connected to the negative side of source 5. A rectifier 19 is connected in parallel with glow tube 18.

The indicator circuit for interlock 4 has a voltage divider circuit including resistors 20 and 21 connected from a point common to the interlock 4 and the relay coil 6 to the switch 7. A cold cathode glow tube has one element connected to the point common to resistors 20 and 21 and the other element to the negative side of terminals 5. A rectifier 23 is connected in parallel with glow tube 22. Although but four interlocks have been shown and described any number may be provided.

The value of the resistors 8 and 9 is selected so that with the circuit energized and the interlocks and reset switch 7 closed the voltage across the glow tube 10 will lie between the potential required to maintain conduction through the tube and the potential required to initiate conduction. The actual value of these resistors will vary with the potential of source 5 and the particular type of cold cathode two element glow tube which is used.

When the machine to be monitored by the fault indicating circuit is energized the undervoltage relay and interlocks are energized by a constant potential source of voltage from the machine. In response to the voltage of source 5, the undervoltage relay picks up readying the machine for operation.

Since all the interlocks are closed the entire potential of source 5 will appear across each of the four voltage divider circuits. The voltage across resistor 9 and its counterparts resistors 13, 17 and 21 is in the range between the ignition and extinction potential of the glow tube. The tubes will remain unlighted until the potential across the tube rises above the voltage required to initiate the glow discharge between the electrodes.

It will be noted that all the divider circuits are returned to the negative side through a common line which may be interrupted by switch 7. When this switch is opened the potential at the points common respectively to resistors 8 and 9, 12 and 13, 16 and 17, 20 and 21 rises to the same value as the voltage across terminals 5. This follows since no current is drawn by the voltage divider circuit and therefore no IR drop appears across resistors 8, 12, 16 and 20.

The source voltage being well above that required to initiate conduction through the tubes, they will now ignite and begin to pass current. The push button switch is now returned to the normal closed position and the circuit is ready for operation.

Closing the push button will not extinguish the glow tubes since the voltage divider circuit maintains the voltage across the glow tube at a value safely above the extinction potential of the tube. The tubes will be extinguished only in response to the opening of an interlock.

For example, suppose an overload relay connected to the interlock 3 senses an overload condition and operates to open that interlock. This removes the voltage from the undervoltage relay and the divider circuits made up of resistors 16, 17 and 20, 21. Since there is no longer a potential across the tube to sustain the discharge the glow tubes 18 and 22 will be extinguished.

From an inspection of the lights, the operator may easily see which of the interlocks has opened to cause the machine to stop. In the event the fault is self-clearing and the machine restarts after automatically resetting the interlock, the lights which indicated the fault remain unchanged, those that were extinguished remain extinguished and those that were lighted remain that way. This memory feature permits the operator to observe the location of faults which are of short duration and also self-clearing.

To reset the indicator lights all the operator need do is depress the push button 7 to place the source voltage across all the glow tubes. With all the interlocks closed all the tubes will be ignited and remain in the conducting state after the switch is closed.

The rectifiers prevent accidental reignition of the glow tube in the event of a short duration fault. Previously, with other methods of coupling to the interlocks, a momentary fault might result in accidental reignition of the tube which should indicate the fault. This reignition was caused by the inductive voltage of the relay coil. As the stored energy in the coil was released, the voltage across the coil might reach many times the value of the source voltage. This voltage tended to sustain the current in the relay coil and so had a polarity opposite to that of the source. Without the shunting rectifier in the circuit this voltage appeared across the glow tube and ignited it in the opposite direction causing a momentary glow. Due to the time lag in extinction of the tube, the interlock might reclose while the tube remained lighted from this inductive surge. If the tube was conducting in the opposite direction when the interlock reclosed, there was a tendency for the tube to reignite from the other direction and the memory feature was lost. Since a shunting rectifier connected directly across the relay coil would delay the relay dropout time this approach to the problem was not satisfactory, even though it did prevent accidental reignition of the tube.

The use of a rectifier in conjunction with each of the voltage dividers has produced a reliable fault indicator which uses simple two element glow tubes and retains a record of the fault despite an immediate reclosing of the interlock.

It will be apparent to those skilled in the art that various changes and modifications may be made in the apparatus illustrated and described without departing from the spirit of the invention and the scope of the appended claims.

What is claimed is:

1. A fault indicating system comprising an electro-responsive device with a winding, a plurality of switches, circuit means connecting said switches in series relationship with each other, first and second connections to a power source, said series switch circuit connected at one end to said first power source connection, said winding connecting the other end of said series switch circuit to said second power source connection, voltage divider means associated with each switch, each of said divider means having one connection to its respective switch, means connecting said divider means to said second power source connection, a glow tube corresponding to each of said switches to indicate the opening of the switch with which it is associated, each of said tubes having a first and second element, means connecting said first elements to said second power source connection, means connecting each of said second elements to the voltage divider of the particular switch with which the glow tube is associated to pick off a voltage in excess of that required to maintain conduction through the tube and less than the voltage required to initiate conduction through the tube, individual rectifier means connected across the tube elements to bypass the induced voltage resulting from the interruption of the current flowing in the winding.

2. A fault indicating system comprising an electro-responsive device with a winding, a plurality of switches, circuit means connecting said switches in series relationship with each other, first and second connections to a power source, said series switch circuit connected at one end to said first power source connection, said winding connecting the other end of said series switch circuit to said second power source connection, voltage divider means associated with each switch, each of said divider means having one connection to its respective switch, means connecting said divider means to said second power source connection to produce a voltage across each of said divider means that corresponds to the voltage across the circuit portion that is controlled by the associated switch, a glow tube corresponding to each of said switches to indicate the opening of the switch with which it is associated, each of said tubes having a first and second element, means connecting said first elements to said second power source connection, means connecting each of said second elements to the voltage divider of the particular switch with which the glow tube is associated to pick off a voltage in excess of that required to maintain conduction through the tube and less than the voltage required to initiate conduction through the tube, a reset switch for interrupting said impedance means between said first and second tube elements for initiating conduction through said tubes, individual rectifier means connected across the tube elements to bypass the induced voltage resulting from the interruption of the current flowing in the winding.

3. A fault indicating system comprising an electroresponsive device with a winding, a plurality of switches, circuit means connecting said switches in series relationship with each other, first and second connections to a power source, said series switch circuit connected at one end to said first power source connection, said winding connecting the other end of said series switch circuit to said second power source connection, voltage divider means associated with each switch, each of said divider means having one connection to its respective switch, reset switch means for connecting said divider means to said second power source connection, a glow tube corresponding to each of said switches to indicate the opening of the switch with which it is associated, each of said tubes having a first and second element, means connecting said first elements to said second power source connection, means connecting each of said second elements to the voltage divider of the particular switch with which the glow tube is associated to pick off a voltage in excess of that required to maintain conduction through the tube and less than the voltage required to initiate conduction through the tube, individual rectifier means connected across the tube elements to bypass the induced voltage resulting from the interruption of the current flowing in the winding.

4. A fault indicating system comprising an undervoltage relay with a winding, a plurality of interlock switches, circuit means connecting said switches in series relationship with each other, first and second connections to a power source, said series switch circuit connected at one end to said first power source connection, said relay winding connecting the other end of said series switch circuit to said second power source connection, voltage divider means associated with each switch, each of said divider means having one connection to its respective switch, reset switch means for connecting said divider means to said second power source connection, a two element cold cathode glow tube corresponding to each of said switches, said tube ceasing conduction to indicate the opening of the switch with which it is associated, each of said tubes having a first and second element, means connecting said first elements to said second power source connection, means connecting each of said second elements to the voltage divider of the particular switch with which the glow tube is associated to pick off a voltage in excess of that required to maintain conduction through the tube and less than the voltage required to initiate conduction through the tube, individual rectifier means connected across the tube elements to bypass the induced voltage resulting from the interruption of current flowing in the winding thereby preventing accidental reignition of the glow tube.

5. In an indicating system adapted to be connected to a direct current energized, series protective circuit which includes interlock switches and an undervoltage relay winding, the combination comprising a plurality of terminals each of said terminals corresponding to a different interlock and adapted to be connected to the side of the interlock switch which becomes disconnected from the interlock power source on opening that switch, voltage divider means for each interlock switch, circuit means connecting each of said divider means in circuit from one of said terminals to the interlock power source so as to be energized by the interlock power source only when the interlock switch with which it is associated is closed, glow tubes corresponding to each interlock switch, means connecting each of said glow tubes to pick off from the voltage divider with which it is associated and impress across the tube a voltage which is less the voltage required to initiate conduction through the tube and greater than the voltage required to maintain conduction through the tube, a reset switch for interrupting said impedance means between the elements of said glow tubes to initiate conduction through said tubes, individual rectifier means connected across the tube elements to bypass the induced voltage resulting from the interruption of current flowing in the undervoltage relay winding.

6. In an indicating system adapted to be connected to a direct current energized, series protective circuit which includes interlock switches and an undervoltage relay winding, the combination comprising a plurality of terminals each of said terminals corresponding to a different interlock and adapted to be connected to the side of the interlock switch which becomes disconnected from the interlock power source on opening that switch, voltage divider means for each interlock switch, circuit means connecting each of said divider means in circuit from one of said terminals to the interlock power source so as to be energized by the interlock power source only when the interlock switch with which it is associated is closed, glow tubes corresponding to each interlock switch, means connecting each of said glow tubes to pick off from the voltage divider with which it is associated and impress across the tube a voltage which is less than the voltage required to initiate conduction through the tube and greater than the voltage required to maintain conduction through the tube, individual rectifier means connected across the tube elements to bypass the induced voltage resulting from the interruption of current flowing in the undervoltage relay winding, switch means for initiating conduction through said tubes.

7. In an indicating system adapted to be connected to a direct current energized, series protective circuit which includes interlock switches and an undervoltage relay winding, the combination comprising a plurality of terminals each of said terminals corresponding to a different interlock and adapted to be connected to the side of the interlock switch which becomes disconnected from the interlock power source on opening that switch, voltage divider means for each interlock switch, circuit means connecting each of said divider means in circuit from one of said terminals to the interlock power source so as to be energized by the interlock power source only when the interlock switch with which it is associated is closed, glow tubes corresponding to each interlock switch, means connecting each of said glow tubes to pick off from the voltage divider with which it is associated and impress across the tube a voltage which is less than the voltage required to initiate conduction through the tube and greater than the voltage required to maintain conduction through the tube, individual rectifier means connected across the tube elements to bypass the induced voltage resulting from the interruption of current flowing in the undervoltage relay winding, switch means in circuit with said voltage dividers for impressing across said tubes a voltage sufficient to initiate conduction through said tubes.

8. In a protective system having in order a first terminal connected to a power source, a first switch, the winding of an electroresponsive device and a second terminal connected to a power source, each in series circuit with the other, indicator means responsive to the condition of said switch comprising impedance means, means normally connecting one end of said impedance means to the side of said first switch that is connected to a first end of said winding and normally connecting the other end of said impedance means a second end of said winding to produce a voltage across said impedance which corresponds to the voltage across said winding, a two element glow tube, means connecting the elements of said tube across a portion of said impedance means to pick off a voltage in excess of that required to maintain conduction through said tube and less than the voltage required to initiate conduction through the tube, a reset switch in circuit with said impedance means to place said source voltage across said elements to initiate conduction through said tube, rectifier means in parallel circuit with said glow tube to present a high impedance to the normal voltage across said tube and a low impedance to the induced voltage resulting from an interruption of the current flowing in said winding.

9. In a protective system having in order a first terminal connected to a power source, a first switch, the winding of an electroresponsive device and a second terminal connected to a power source, each in series circuit with the other, indicator means responsive to the condition of said switch comprising impedance means, means normally connecting one end of said impedance means to the side of said first switch that is connected to a first end of said winding and normally connecting the other end of said impedance means a second end of said winding to produce a voltage across said impedance which corresponds to the voltage across said winding, a two element glow tube, means connecting the elements of said tube across a portion of said impedance means to pick off a voltage in excess of that required to maintain conduction through said tube and less than the voltage required to initiate conduction through the tube, a reset switch for interrupting said portion of said impedance means across which said tube elements are connected to place said source voltage across said elements to initiate conduction through said tube, rectifier means in parallel circuit with said glow tube to present a high impedance to the normal voltage across said tube and a low impedance to the induced voltage resulting from an interruption of the current flowing in said winding.

References Cited in the file of this patent
UNITED STATES PATENTS

| | | |
|---|---|---|
| 2,684,466 | Staples et al. | July 20, 1954 |
| 2,822,535 | Fields | Feb. 4, 1958 |
| 2,860,287 | Koranye | Nov. 11, 1958 |
| 2,900,628 | Fegely et al. | Aug. 18, 1959 |